United States Patent [19]
Niemeyer et al.

[11] Patent Number: 5,728,474
[45] Date of Patent: Mar. 17, 1998

[54] EDGE DESIGN FOR INSULATED MOLD

[75] Inventors: Matthew F. Niemeyer, North Chatham, N.Y.; John L. Currier, Adams, Mass.; James J. Carroll, Sr., Ballston Lake; Charles E. Baumgartner, Niskayona, both of N.Y.

[73] Assignee: General Electric Company, Pittsfield, Mass.

[21] Appl. No.: 709,236

[22] Filed: Sep. 3, 1996

Related U.S. Application Data

[62] Division of Ser. No. 167,491, Dec. 14, 1993, abandoned.

[51] Int. Cl.⁶ .................. B29C 33/56; B28B 7/36
[52] U.S. Cl. .............. 428/458; 428/402; 428/473.5; 264/328.1
[58] Field of Search .................. 428/457, 458, 428/402, 473.5; 264/328.1, 328.11, 328.14, 330, 334; 425/149, 556

[56] References Cited

U.S. PATENT DOCUMENTS

| | | | |
|---|---|---|---|
| 4,225,109 | 9/1980 | Yotsutsuji et al. | 249/111 |
| 4,670,479 | 6/1987 | Mijiauchi | 524/154 |
| 4,734,488 | 3/1988 | Hasuo et al. | 528/196 |
| 4,774,315 | 9/1988 | Miller | 528/179 |
| 4,900,242 | 2/1990 | Maus et al. | 425/149 |
| 4,902,735 | 2/1990 | Okamuto et al. | 524/151 |
| 4,977,233 | 12/1990 | Okamuto et al. | 528/198 |
| 4,997,903 | 3/1991 | Okamuto | 528/198 |
| 5,041,247 | 8/1991 | Kim | 264/37 |
| 5,290,597 | 3/1994 | Baumgartner et al. | 427/306 |
| 5,535,980 | 7/1996 | Baumgartner et al. | 249/114.1 |

FOREIGN PATENT DOCUMENTS

| | | |
|---|---|---|
| 0489335 | 6/1992 | European Pat. Off. |
| EU 0 489 335 A1 | 6/1992 | European Pat. Off. |
| 2319477 | 2/1977 | France . |
| 2151697 | 4/1972 | Germany . |
| 3137598 | 6/1983 | Germany . |
| 62207-358-A | 9/1987 | Japan . |

*Primary Examiner*—Daniel Zirker

[57] ABSTRACT

An insulated mold for thermoplastics, has a recessed mold area and an elevated land area. An insulating material is deposited in the mold area and a hard layer of metal is deposited on the insulating layer. The land protects the insulating layer from delamination. Also, in some embodiments, a transition between the land and the recessed mold area is provided. The protective member may also be employed to hold down the edge of the insulating layer and to shield the edge from molten thermal plastics, thereby preventing delamination.

7 Claims, 7 Drawing Sheets

EDGE DESIGN FOR INSULATED MOLD

This is a divisional of application Ser. No. 08/167,491 filed on Dec. 14, 1993 now abandoned.

BACKGROUND OF THE INVENTION

This invention relates to molds for thermoplastic materials, and more particularly, to the edge or cavity termination of such molds.

Various types of molds have long been in use for preparing shaped articles from thermoplastic resins, in such operations as blow molding, compression molding, injection molding and injection compression molding. Molds for these purposes are typically manufactured from metal or a similar material having high thermal conductivity.

Blow molding involves the extrusion of a molten tube of resin called a parison into a mold. The mold closes around the parison, pinching the bottom of the parison closed. A gas such as air is then introduced causing the tube to expand against the cool surfaces of the mold.

In compression molding, composite blanks of glass reinforced thermoplastic sheets are heated. The material is heated above its melting point or if an amorphous material at least substantially above its glass transition temperature. When the composite blanks are heated, they expand (loft) due to the recoil forces within the fibers. The hot blanks are then pressed between cool mold surfaces which are below the melting point or glass transition temperature.

Injection molding involves injecting molten thermoplastic resin into a mold apparatus which has mold halves which close to form a mold cavity. A hot resin is injected, which thereafter cools. The mold halves are opened and the article is removed.

In injection compression molding which is a combined process, a hot thermoplastic melt is injected into a mold cavity. The parting line of the mold is positioned open or allowed to be forced open by the injected melt typically 0.05" to 0.3" inches. The clamping force is increased initiating the compression stroke of the mold forcing the melt to fill the cavity.

When hot thermoplastic material contacts the thermally conductive surfaces of such molds, rapid quenching and resulting reduced flow of the melt at the mold surface creates several problems, particularly when molding resins which contain large amounts of fillers in the form of fibers and powders. The freezing of these materials at the mold surfaces creates rough surfaces such as exposed fillers, voids and porosity. The quick solidification of the melt combined with limited flowability of the materials makes it difficult to achieve melt flow over a large area. This is especially troublesome when producing thin parts. The use of multiple gates for large and often complex mold cavities produces weld lines where flow fronts meet, which are unsightly and weak. Another important consideration is the residual stresses in the molded parts which can result in dimensional instability over the lifetime of the part. Non-uniform residual stresses are often characterized by non-uniform or severe birefringence. Dimensional stability and uniformity of refractive indices are required for high quality parts.

There have recently been disclosed multilayer molds of the various types referred to herein in which a metal core has an insulating layer bonded thereto, for the purpose of slowing the initial cooling of the resin during the molding operation. The insulating layer is fabricated of material having low thermal conductivity, thus slowing the cooling of the molten resin, and also having good resistance to high temperature degradation, permitting use in a mold maintained at high temperatures. Said layer may be made of a resin such as polyimide, polyamideimide, polyethersulfone or polyetherketone, typically applied in uncured form (e.g., as a polyamic acid in the case of a polyimide or polyamideimide) and subsequently cured. Cured resins in a solvent carrier may now be employed.

The insulating layer is strengthened by the application of a metal filled (e.g., Ni) primer layer and an overcoat of one or more skin layers of hard material, typically Ni metal, bonded to the insulating layer. The skin layer may be deposited by such operations as electroless deposition, electrolytic deposition and combinations thereof.

Protection of the thermal insulator from exposure to, and hence the abrasion by, the plastic melt during molding is a key feature in designing durable dynamic edges for insulated molds. Even though protected by the hard skin layer, such resinous insulating layers have a major disadvantage in that they are not mechanically strong and are easily damaged. This is especially true near the boundary of the mold cavity. For example, the previous mold edges, terminated by simply machining the coating and plating at the mold edge, exhibited a propensity to delaminate or chip during molding. The two mechanisms that are believed to be responsible for the delamination are chipping of the coating by movement of the mold insert and abrasion of the exposed insulator at the mold edge by the resin melt.

In blow molding applications, the shear and flow of material on the exposed edge is usually not rigorous enough to initiate failure. However, in injection and injection/compression molding the pressures and flow are significantly greater requiring higher tolerance in tool construction and a more durable system. An exposed insulated edge is not durable enough to withstand the conditions of injection molding.

It is therefore desirable to have insulated mold edges especially suitable for injection and injection/compression molding. In particular, it is desirable to isolate the coated and plated tool edge.

SUMMARY OF THE INVENTION

The present invention is based on the discovery that isolation of the insulated coating at the mold cavity edge is important to the long term durability of the mold. A thin land protects the interface between the bulk thickness of insulator and the tool steel. The land also provides a reference for thickness during the deposition and finishing of the insulation (e.g., polyamideimide) layer. The topcoat and plating are applied on top of the insulation layer and the thin protective land. The excess topcoat and plating are removed from the vertical side for final fit and assembly of the mold.

In one embodiment, isolation of the coated edge is achieved by employing inserts or retainers either bolded or clamped in place. In another embodiment, the coating proceeds past the parting line of the cavity and the edge is locked in place by the core half of the mold. Additional embodiments relate to core pins, bosses, and knock out pins, each requiring the coat/plating be terminated and isolated from the melt and moving portions of the tool.

Accordingly, one aspect of the invention is a mold comprising:

a substrate having high thermal conductivity and having a mold area and contiguous elevated land areas;

a first layer of filled or unfilled temperature-resistant material having low thermal conductivity, deposited on said substrate at least in the mold areas; a second layer deposited on the first layer, in the form of a durable coating; and a third layer deposited on the durable coating and the contiguous land areas in the form of a cohesive hard metal coating.

In another embodiment, the second layer comprises a porous matrix comprising a suspension of metal particles in a temperature-resistant material having low thermal conductivity which acts as a primer for the hard metal skin layer which is deposited thereon. The hard skin layer penetrates the pores and forms a good mechanical bond with the primer layer.

Another aspect of the invention is a method for molding thermoplastic articles by injecting a plastic into such mold, allowing the mold to cool and ejecting the article from the mold.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof may best be understood by reference to the following description taken in conjunction with the accompanying drawing figures in which:

FIG. 5 is an enlarged fragmentary drawing showing the primer layer as a matrix of metal particles in the insulation layer;

DESCRIPTION OF THE INVENTION

Figure 1:
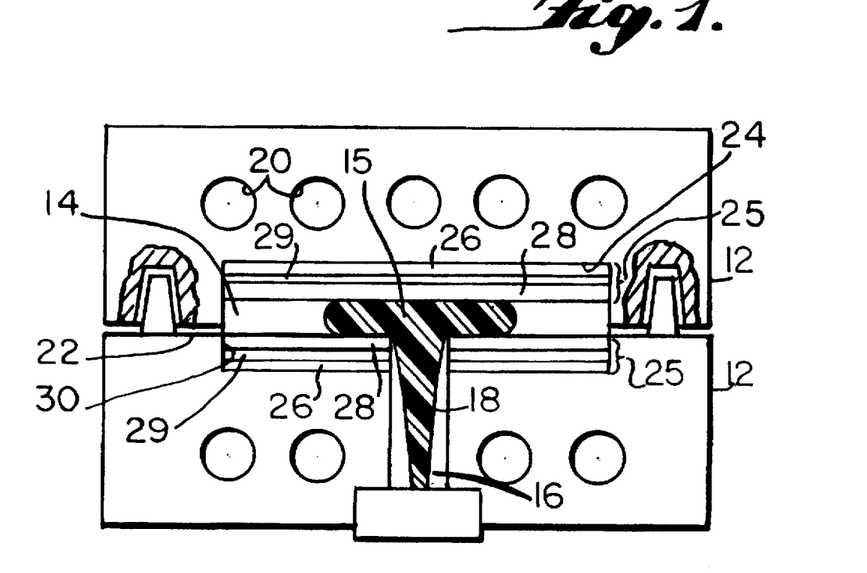
FIG. 1 is a fragmentary schematic side sectional view of an injection compression molding apparatus with one or more gates employing an insulated mold according to the invention.

Referring now to the drawings where like numerals indicate like elements throughout, FIG. 1 shows a multilayered mold 10 of the present invention. While the attributes of the present invention are applicable to many types of molding, an injection compression molding apparatus is illustrated in the drawings. The mold 10 comprises two core halves 12 relatively moveable with respect to each other and situated in opposing or confronting relationship so as to form a mold cavity 14 therebetween. Hot thermoplastic resin 15 is injected from a source (not shown) into the mold cavity 14 via a sprue 16 and a gate 18. After the injection step, the mold halves 12 may be moved relative to each other to further compress and spread the thermoplastic material in the cavity 14. The mold halves 12 are made of a material with a relatively high thermal conductivity such as iron, steel, stainless steel, aluminum alloy or brass. Cooling lines 20 for receiving a cooling fluid are provided in the core halves to reduce cycle time. Each core half 12 may be formed with an upstanding land area 22 which forms a pool or recess 24. A thermal layer 25 is disposed on each of the core halves 12 in the recess 24. The land 22 is about 0.02 inches wide and has a height approximately that of the thermal layer 25.

In the embodiment illustrated, the thermal layer 25 is a composite of a thermal insulating layer 26 and a hard coat 28. The thermal insulating layer 26 is ideally made from a low thermally conductive material such as high temperature thermoplastics, thermosets, plastic composites, porous metals, ceramics and low-conductivity metal alloys. Other low thermally conductive materials used for insulation could also be used. Further, the insulating layer 26 is made of a resin such as polyimides, polyamideimides, polyamides, polysulfone, polyethersulfone, polytetrafluoroethylene, polyetherketone, with or without fillers, typically applied in uncured form (e.g., as a polyamic acid in the case of a polyimide or polyamideimide) and subsequently heat cured.

Depending on the type of insulating material selected, the insulating layer is often not sufficiently strong enough to withstand the molding process and cannot produce the desired surface quality. Therefore the durable hard skin layer 28 is applied over the insulating layer 26 to protect it and to provide the desired surface finish. The skin layer 28 must be made from a material which exhibits mechanical strength and abrasion resistance. The skin layer 28 should also have a reasonably high thermal conductivity and is preferably fabricated from nickel but may also fabricated from carbon steel, stainless steel, aluminum, brass, copper, ceramics, glass, quartz, plastics and plastic composites. Metal alloys with a low thermal expansion coefficient, such as Invar ferronickel, can also be used. The skin layer 28 may be electro-deposited, or preferably electroless deposited on the insulating layer 26 as hereafter described. In order to improve adhesion of the hard skin layer 28 to the insulating layer, an intermediate primer layer 29 may be deposited on to the insulating layer 26.

The insulating layer 26, the durable skin layer 28 and the primer layer 29 if used, forming the thermal layer 25, a fragile and susceptible to separation from each other and from the mold half 12. This is especially true along the boundary or margin 30 of the recess 24 adjacent the land area 22. Accordingly, a number of alternative embodiments, illustrated in Figs. 2A–2C, may be employed to protect the edge of the thermal layer 25. In one embodiment (FIG. 2A) the hard skin layer 28 extends over the land area 22 as a hard cohesive metal layer. The skin layer 28 may be deposited contiguously on the insulating layer 26 extending over the margin 30 and atop the upper surface 31 of the land 22. Thus, the entire thermal layer 25 formed in this way is strengthened and less susceptible to failure.

It is desirable to have a finished land area free of any coatings including hard coating 28. Accordingly, in another embodiment shown in FIG. 2B, the thermal layer 25 is finished to a height which is coplanar with the land area 22, and an edge protecting member or block 32 engages the thermal coating 25 and the land area 22 in bridging relationship is shown.

Figure 2A:
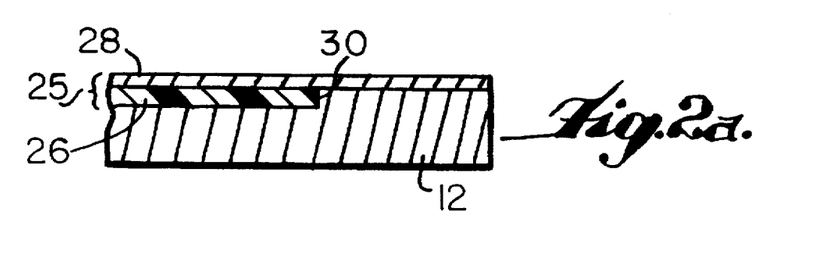
FIGS. 2A–2C are schematic side sectional illustrations of various embodiments of the invention.
Figure 2B:
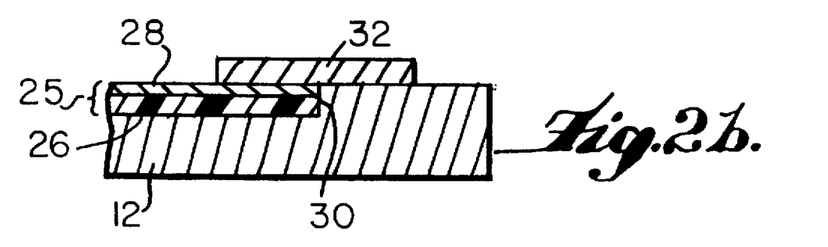
Figure 2C:
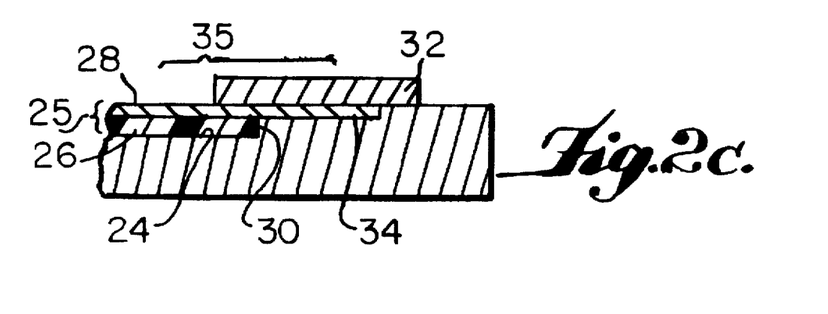

In yet another embodiment shown in FIG. 2C, the recess 24 has a stepped portion 34 forming a transition 35 near the marginal edge 30 to a depth sufficient to accommodate the thickness of the hard coat 28, which is finished to a high coplanar with the land area 22. In such an arrangement, an edge protecting member or block 33 bridges all or part of the transition 35 between the land and the thermal layer 25.

Figure 3:
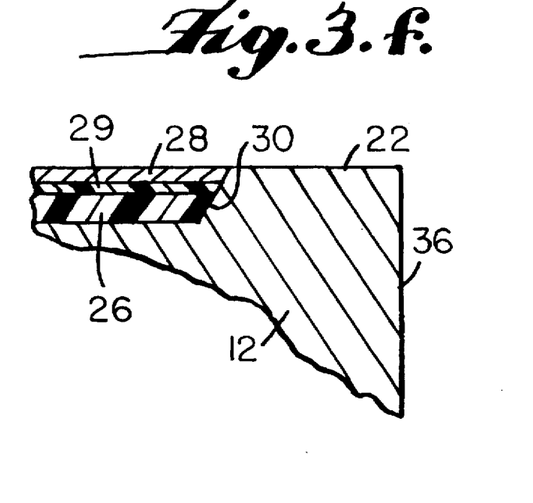
FIGS. 3A–3F are schematic fragmentary side sectional views showing various process steps for forming an insulated mold according co the present invention.
Figure 3A:
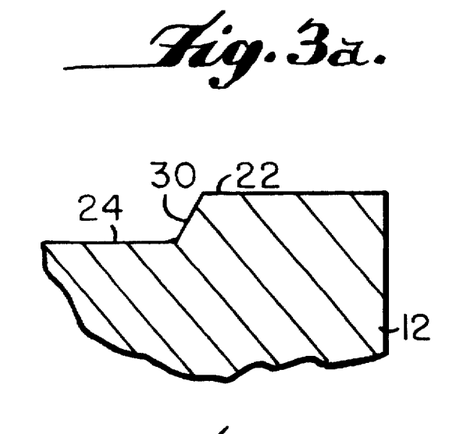

FIGS. 3A–3F illustrate a series of exemplary steps for forming the insulated mold according to the present invention. In FIG. 3A the core 12 is formed with the recess 24 to a depth of about 0.016 inches. The marginal edge 30 may be beveled as shown. The land 22 is formed appropriate with, for example, 0.02 inches.

Figure 3B:
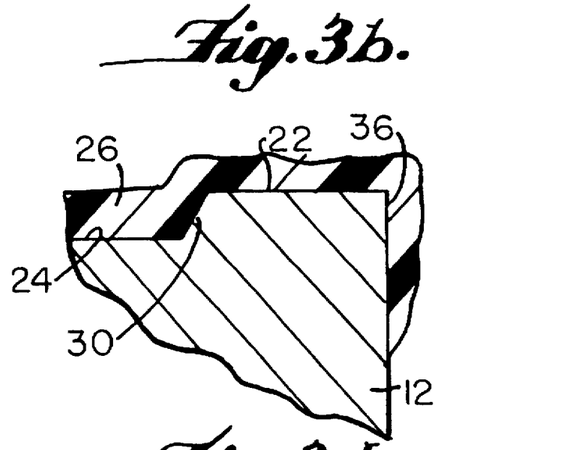

In FIG. 3B, the thermal insulating layer 26 is deposited, for example, by solution coating on to the tool surface. It is difficult to properly mask these tool surfaces. Accordingly, the insulating material is built up over the land area 22 and around the sides 36 as shown.

Figure 3C:
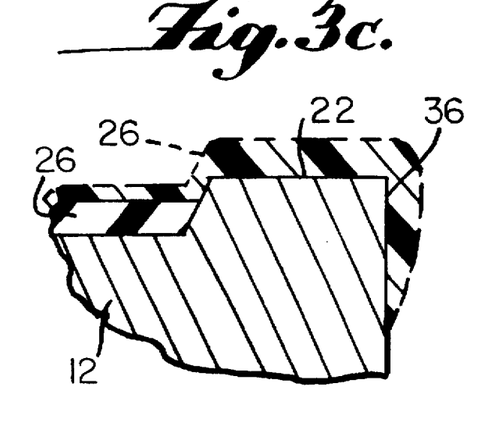

In FIG. 3C, the thermal insulating material 26 is machined to remove the excess (shown in dotted line) from the land 22 and the sides 36. The thickness of the remaining material is about 0.012 inches. The upper surface of the insulating material is uniform and free of machine marks.

Figure 3D:
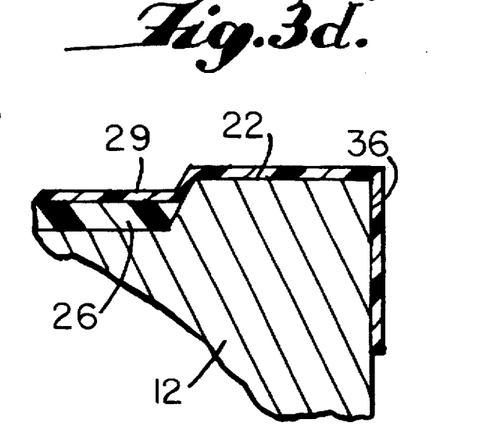

In FIG. 3D, the top coat or primer material 29 is deposited on to the insulating material 26 and on to the land area 22 and sides 36. The primer 29 provides media for proper bonding of the hard coat 28.

Figure 3E:
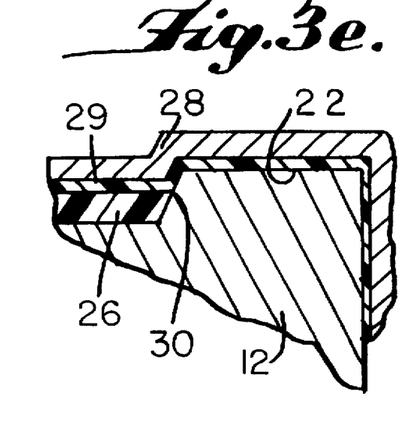

In FIG. 3E, the primer 29 is catalyzed and thereafter the hard coat, e.g., electroless nickel, is deposited thereon to a thickness of about 0.006 inches. The hard coat 28 extends over the land 22 and the sides 36.

In FIG. 3F, excess hard coat 28 is removed and polished to the level of the land 22 as shown.

FIGS. 4A–4J show further variations of the invention wherein similar elements have the same reference numerals.

Figure 4A:
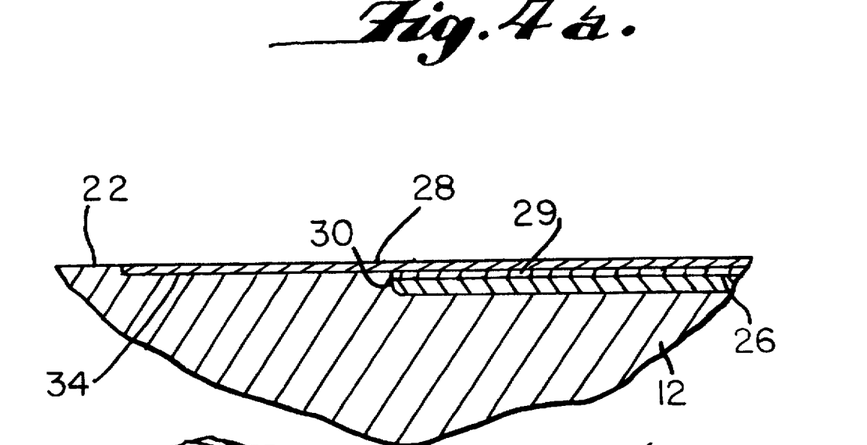
FIGS. 4A–4J are sectional drawings illustrating various embodiments of the invention in greater detail.

In FIG. 4A, the insulating layer 26 is formed in recess 24. The step portion 34 receives the hard coat 28 which is finished coplanar with the land 22. The transition 35 between the land 22 and coating 28 may be protected by a block (not shown) but which is described below.

The insulating layer 26 and the durable skin layer 28 are fragile and susceptible to separation from each other and the recess 24, especially along the boundary of the mold area in the vicinity of the land areas 22. Accordingly, in an alternative embodiment the hard skin layer 28 may extend over the land area 22 as a hard, contiguous cohesive metal layer.

In order to improve adhesion of the hard skin layer 28 to the insulating layer 26, the intermediate primer layer 29 is deposited onto the insulating layer 26. The primer layer 29 does not normally improve adhesion of the hard skin layer 28 to the land 24. Therefore, the portions of the primer layer 29 and the insulating layer 26 overlying the land 22 are removed prior to plating as described below.

Figure 4B:
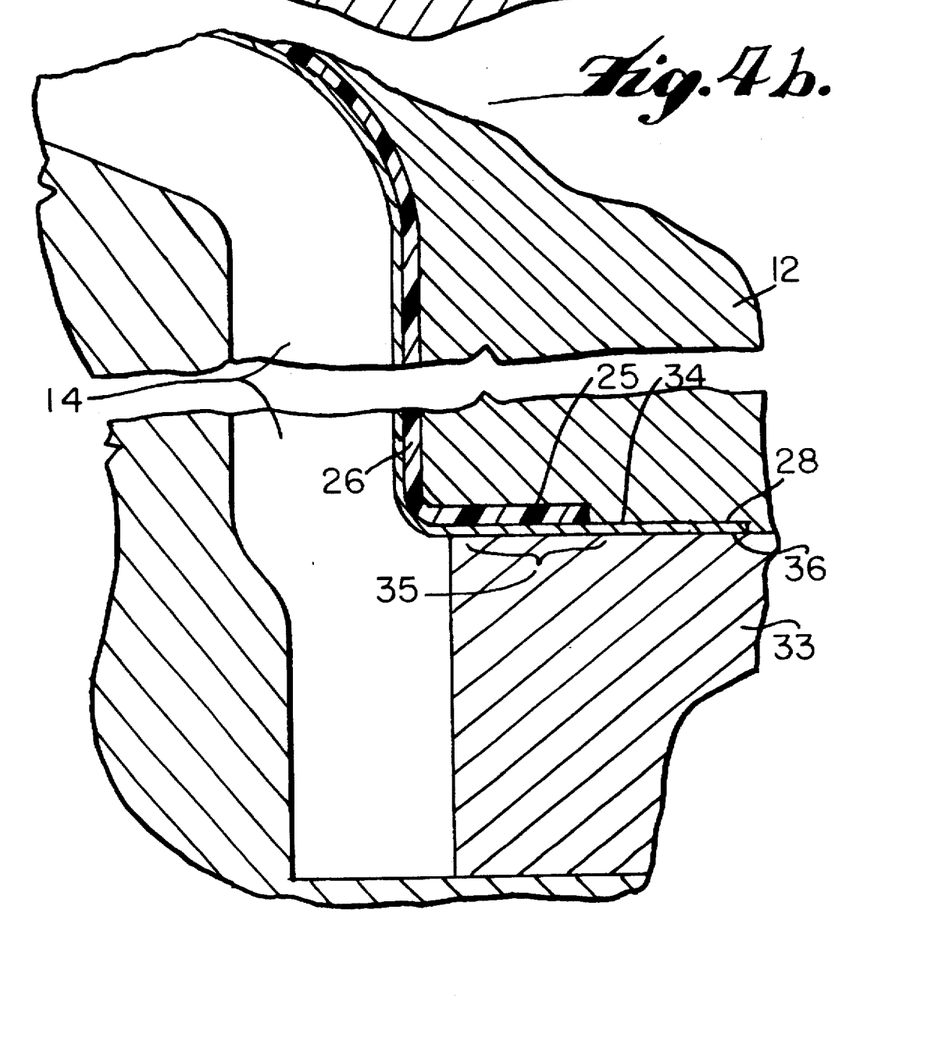

In FIG. 4B, the step 34 forms transition 35 in the side wall 36 of the core 12. In this embodiment a block 33 engages the transition 35 from the side as shown.

Figure 4C:
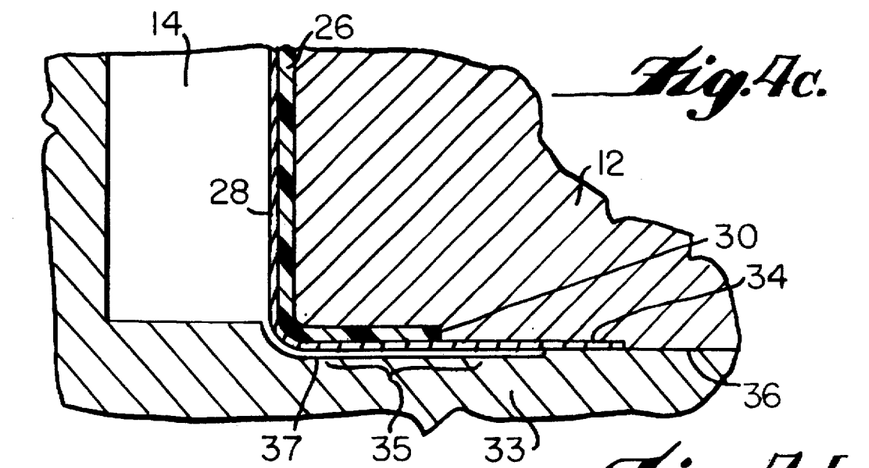

In FIG. 4C is similar to FIG. 4B. However, Block 33 is formed with a step 37 to provide hold down clearance.

Figure 4D:
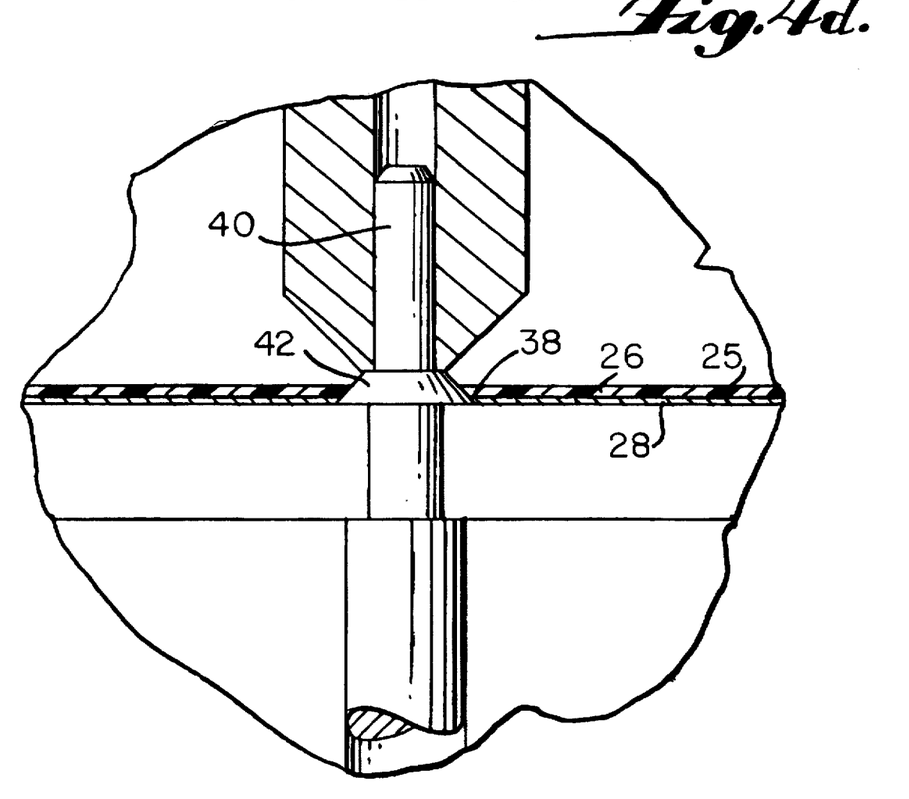

In FIG. 4D, the thermal layer 26 and hard coat 28 terminate at a free beveled edge 38 with a core hold down 40. A beveled core part 42 is secured in the core hold down 40 and has a complementary beveled surface which engages the surface 38 to protect and hold down the terminal or marginal edge of the thermal coating.

Figure 4E:
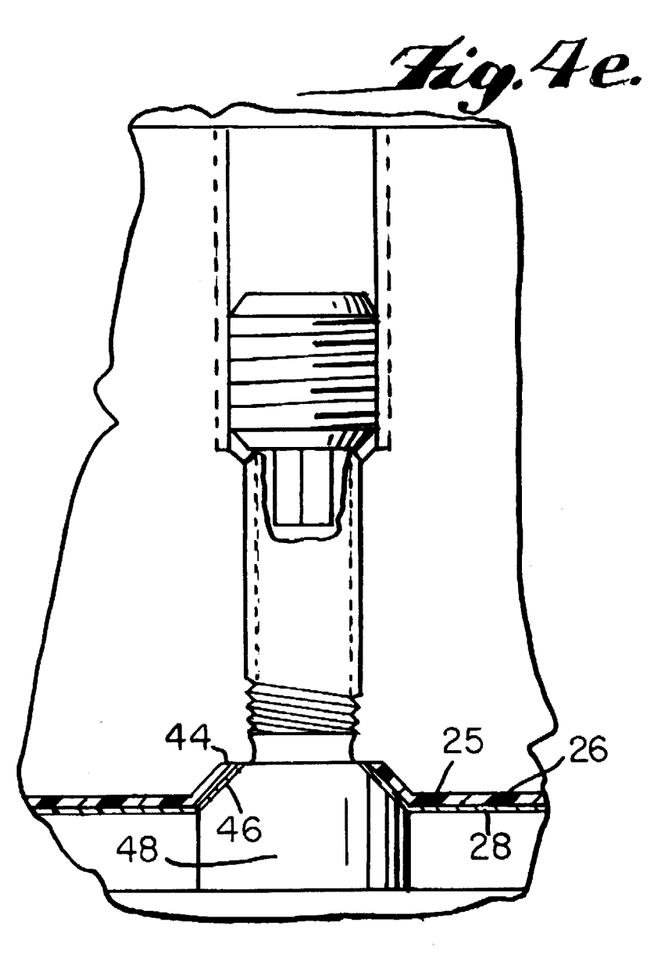

In FIG. 4E, the coating terminates at the base 44 countersink 46. In this arrangement, the coating conforms to the bevel of the countersink and the tapered hold down 48 presses against the coating to protect the edge or terminal portion.

The arrangements of FIGS. 4D–4E may alternatively be provided with similar threaded knockout plugs and corresponding angled boss plugs (not shown).

Figure 4F:
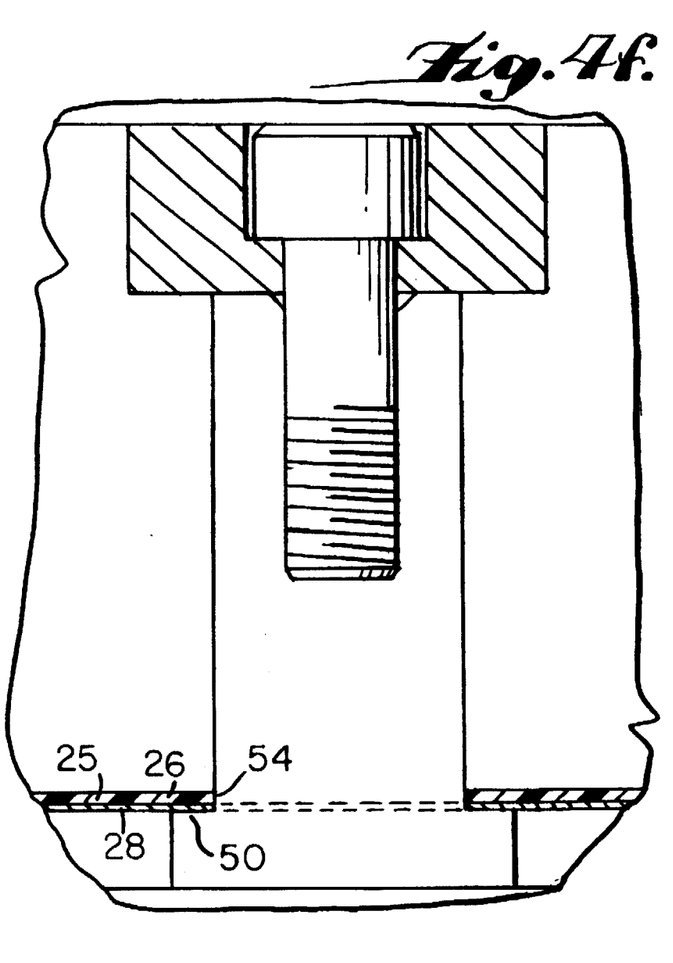

In FIG. 4F, a lower step portion 50 of the core hold down pin 52 securing the coating which terminates at opening 54.

Figure 4G:
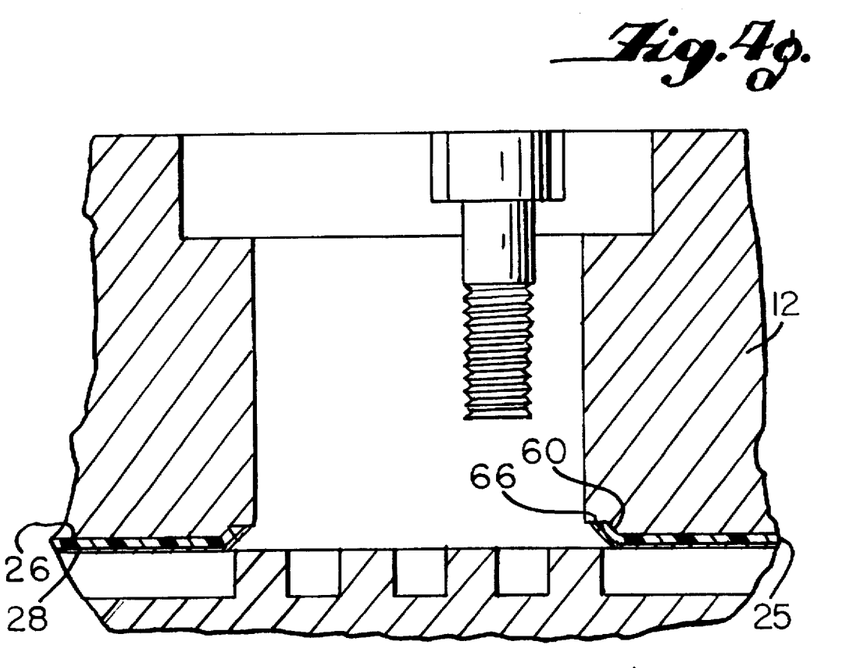

In FIG. 4G, the coating extends along beveled surface 60 and terminates at inner step 66.

Figure 4H:
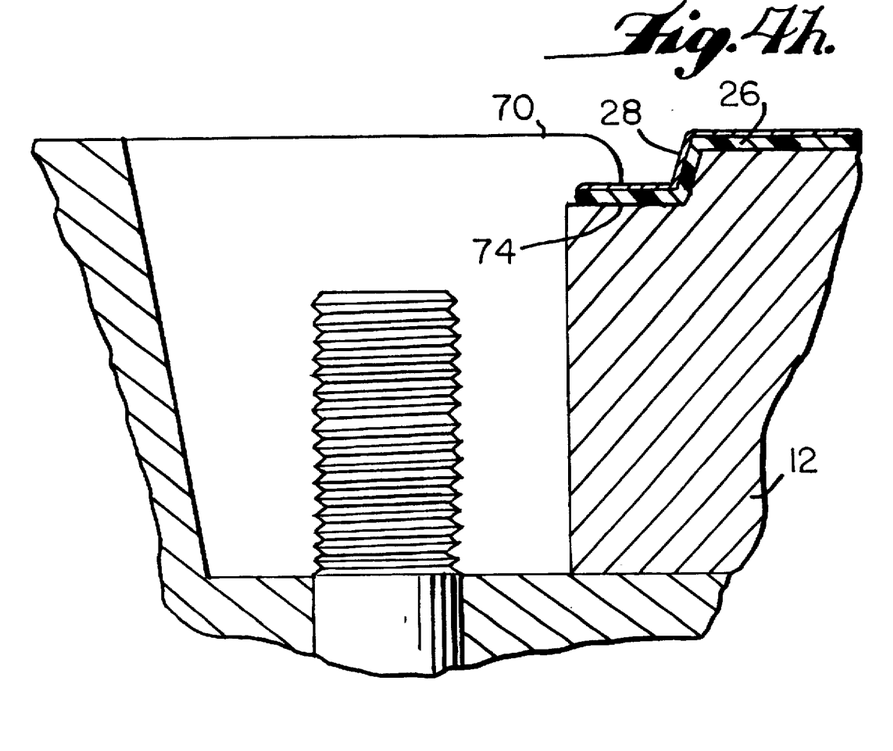

In FIG. 4H, a perimeter block 70 engages a stepped edge 74 of the coating. The arrangement is suitable for forming elongated openings for a grill.

Figure 4I:
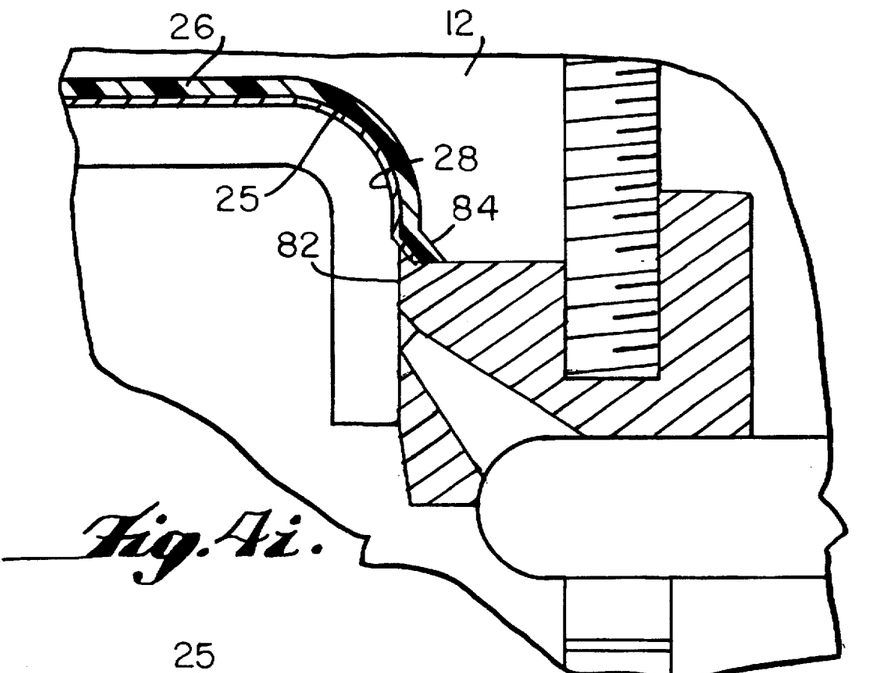

In FIG. 4I, a tunnel gate 80 has a tapered edge 82 which engages the complementary coated surface 84 of the mold as shown.

Figure 4J:
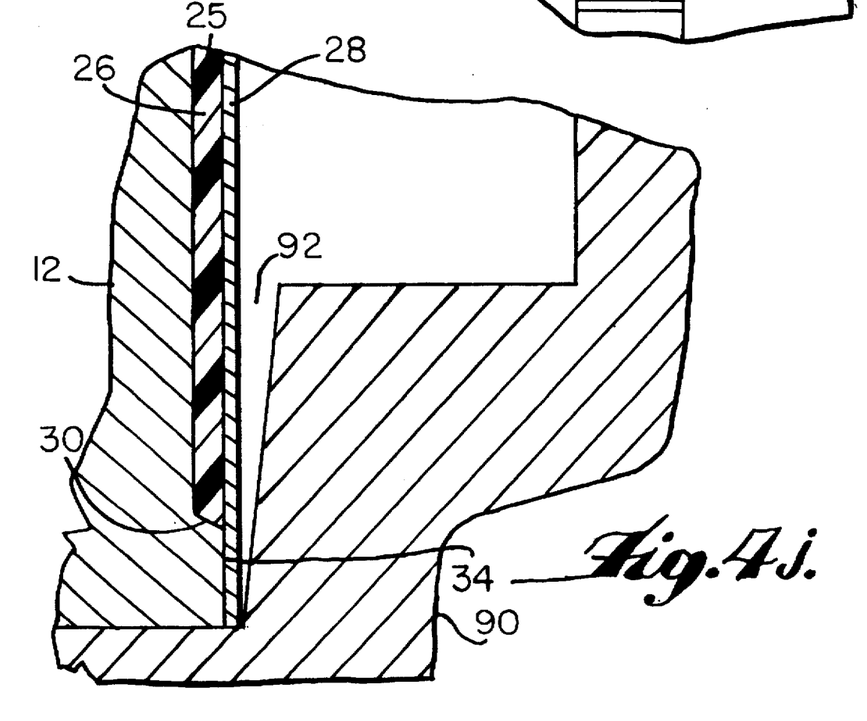

In FIG. 4J, the mold 14 and block 90 form a tapered sheer edge cavity 92 but do not totally engage the marginal edge of the coating. A hold down is not always required especially when the deep recess is employed as shown.

Other variations are of course available and would be readily apparent to those skilled in the art. Variations may employ a recessed transition and various edge protection devices including hold down locks and the like.

In operation (FIG. 1), as the hot thermoplastic resin 15 is injected into (and if desired, compressed in) the mold cavity 14, heat from the resin 15 is absorbed by the skin layer 28. The insulating layer 26 prevents quick cooling of the resin and causes the skin layer 28 to reheat. This results in a hot plastic surface for a short time period. The hard skin layer 28 provides the desired surface quality to the finished part. The part is held in the mold 10 for a time sufficient for the article to cool below the glass transition temperature of the resin, and it is then ejected from the mold.

In accordance with a feature of the invention, the insulating layer 26 and primer layer 29 form a composite in contact with the core 14 and the outer skin layer 28. The primer 29 comprises a porous matrix of particles 144 embedded in a continuous phase material 146. When used with the hard outer skin layer 28, the particles 146 are preferably of the same or a similar material. The hard skin layer 28 enters the porous matrix and bonds to the metal particles 144 forming anchoring points for enhancing adhesion of the outer skin layer 28 to the insulating layer 26.

The insulating layer 26 is typically a resin, i.e., a polymer of the type described herein, having low thermal conductivity and being resistant to high temperatures. Polyimides, polyamidimides, polyethersulfones and polyetherketones are illustrative. Polyimides and polyamidimides are often preferred. The inner layer 40 may be lightly filled with an inorganic filler (e.g., $B_aSO_4$) or quartz powder having a particle size of about 10–20µ. The polyimide may optionally be a fluorinated polyimide to further enhance adhesion of deposited metal.

Said insulating layer 26 may be deposited by any of numerous art-recognized methods such as roller coating or spraying. In the case of a mold, spraying is usually preferred because of its effectiveness to coat an irregular surface uniformly. Many of the exemplary resins contemplated herein, including polyimides and polyamideimides, are cured after deposition. The thickness of the primer layer is not critical but is typically in the range of about 10–500 microns.

The continuous phase 146 of the metal-containing primer layer 29 is likewise a temperature-resistant polymer having low thermal conductivity. Said polymer is most often identical to the one employed as the insulating layer 26. The identity of the metal particles 144 suspended in the polymer 146 is not critical so long as it is substantially resistant to oxidation under the conditions of use of the mold. Nickel is often preferred.

The shape of the metal particles 144 is also not critical. However, non-spherical particles are preferred because they promote better adhesion to the hard skin layer 28. They may be, for example, in the form of platelets, fibers or whiskers. Typical metal particle sizes are in the range of about 1–20 microns. It is preferred that the bulk density of the metal particles be below about 2 g./cc. The thickness of the primer layer 30 is typically in the range of about 10–100 microns, with about 25–50 microns usually being preferred.

The primer layer 29 adheres well to the insulating layer 28 because both layers are coated from nearly identical solvent systems allowing good interpenetration of the resins. The Ni particles or strands in the primer may comprise the majority of the layer by weight, are coated and encapsulated with the resin forming a porous continuous phase 146 having pores.

For a more detailed description of useful processes for preparing the various coating layers herein, reference is directed to U.S. patent application Ser. No. 08/107,863, filed Aug. 17, 1993, now U.S. Pat. No. 5,535,980, Entitled: "Method and Apparatus For Molding Thermoplastic Material Employing Molds with Improved Surface Properties", and U.S. Pat. No. 5,290,597, filed Apr. 27, 1992, Entitled: "Method of Treating Halogenated Polyimide Substrates for Increasing Adhesion of Metal Layer Therein", assigned to General Electric Company, the assignee herein, the teachings of which are incorporated herein by reference.

The hard metal coating 28 is deposited, for example, by electroless deposition, on to the primer layer 29 and the land areas 22. During deposition of a Ni deposit over the primer, the hard layer 28 penetrates the porous primer 29 and becomes mechanically tied thereto, as well as potentially developing metallic bonding to the exposed Ni particles 144. The electroless Ni hard coating 28 also has good adhesion or affinity for the metal land area 22. It can be appreciated that adhesion of the final electroless coating 28 should be influenced by conditions such as: the morphology or porosity of the primer layer 29 (Ni type, Ni/resin ratio, resin type, and application temperature); how well the electroless Ni deposit penetrates into the porous structure (surface preparation and preplating conditions); and the primer layer integrity as well as its bonding to the insulator surface (resin section, application temperature, Ni/resin ratio). At the same time, the surface characteristics and composition of the land area 22 affects the adhesion of the hard layer 28 thereto. The hard skin layer 28 may be deposited to a thickness in a range from about 0.0005 to about 0.005 inches and preferably to a thickness of about 0.002 inches.

The article molded by contact with the mold described herein has a resulting surface which may be characterized as finished, that is, having a Gardner gloss at 60° greater than about 85, determined in accordance with ASTM Standard Test Method for Specular Gloss Designation D523-89, and a mean average roughness $R_a$ of less than about 0.1–0.2 micrometers (i.e., the arithmetic average height of roughness irregularities measured from a mean line which is within an evaluation length L). Other measurements which are used to characterize surface quality are: maximum roughness depth (per DIN) $R_{max}$, which is the largest of the five (5) maximum peak-to-valley roughness depths in five (5) successive sampling lengths; and mean roughness depth $R_z$ (per DIN)—also known as $R_{TM}$—which is the mean of five (5) maximum peak-to-valley roughness depths in five (5) successive sampling lengths. The measurement accuracy may be characterized by ANSI-B46.1; ISO; DIN or MIL specifications. Such a surface needs no further finishing and may conveniently referred to as a class "A" finish. Such a finish is aesthetic. Thus, while the measured gloss and roughness are desirable characteristics to be achieved, human evaluation may prevail as to the acceptability of such a surface.

According to the invention, various thermoplastic materials may be employed with the mold to produce finished products. Such plastics include polyamide materials sold under the trade designation "Nylon 6" or "Nylon 12" or "Nylon 6.6"; and other polymers such as polyesters, such as poly (butylene terephthalate) (PBT), poly (ethylene terephthalate) (PET), and PBT with soft ether linkages formed of polycarbonate and methylene, polyether ketones, polyetherimides, polylactams, polypropylenes, polyethylenes, polystyrene (PS), styrene acrylonitrile, acrylonitrile butadiene terpolymers, polyphenylene oxide (PPO) /polystyrene and PPO/nylon and high impact styrenes filled or unfilled and blends thereof. Materials particularly suited for use in the invention, because of their versatility, strength and appearance include filled or unfilled polycarbonates, polyesters, polyphenylene oxide, acrylonitrile butidiene styrene (ABS), polyimide and polymeric combinations of such materials.

In addition to the foregoing, the following patents, the teachings of which are incorporated herein by reference disclose materials particularly useful for molding optical media such as optical discs and compact discs, and business machine parts which require optimum surface properties: Mille, U.S. Pat. Nos. 4,774,315 and 4,788,275; Okamuto, U.S. Pat. Nos. 4,997,903, Okamuto et al., U.S. Pat. Nos. 4,977,233 and 4,902,735; Hasuo et al., U.S. Pat. No. 4,734, 488; Myiauchi, U.S. Pat. No. 4,670,479 and Japanese Patent J62207-358-A. These references disclose various materials having an average molecular weight within the range from about 10,000 and about 18,000 suitable for the molding applications herein discussed as well as other applications of interest to those skilled in the art.

The process according to the present invention is directed to the use of a mold as described herein for making articles. In particular, the mold may be employed in an injection molding or injection compression molding process where molten thermoplastic material is injected into a mold cavity. The molten material spreads throughout the cavity and is held therein for a time sufficient to cool below the glass transition temperature after which the molded article is ejected. In compression/injection molding, the molten thermoplastic material is compressed after the injection step. The invention results in molded articles having less severe and more uniform birefringence, less stress, a smoother surface finish and better optical properties.

The molding apparatus may employ a so-called cold runner or a hot runner in the feed. The apparatus may also employ a gas assist to implement the process. Gas assist known to those skilled in the art is especially useful in molding articles having a hollow strengthening rib or channel.

Another aspect of the invention is directed to a method for making molds having an insulated mold surface coating and in particular, a method for making a mold comprising forming a mold surface having a mold area and an adjacent elevated land areas; forming a layer of insulating material on the mold surface; forming a primer layer on the insulating layer; and forming a cohesive metallic layer on the primer layer and the land area. When the insulating and primer layers are deposited on the land area, the process requires removal of those portions of the insulating layer and prime layer thereat to expose the land area. The method allows the deposition of a contiguous hard coating on the insulating layer and the land area which protects marginal edges of the insulating layer.

According to the invention as described above, superior durability is obtained by physically isolating the thermal insulator from the mold edge. This is done by proving a thin steel ridge or land around the perimeter of the mold. The width of this land is commonly on the order of 0.02 inches and its height equals the insulator thickness. This, in effect, makes a pool into which the insulator is coated across the remaining mold surface protecting it from being chipped during movement of the mold insert. However, coating and plating of the insulator only in this pool area does not produce a durable termination for two reasons. First, there is still a line of exposed insulator at its junction with the land area and erosion can occur in this region during molding. Second, the primer used to obtain adhesion between the plastic thermal insulator and the electroless Ni deposit, does not provide satisfactory adhesion between the electroless Ni deposit and the steel in the land area. This results in an inherent weak bond which is prone to either blistering during plating or delamination during molding.

These problems are overcome by the edge design produced in accordance with the invention. First, the insulator is coated within the pool area as described above and additionally over the top of the land area. Once the proper insulator thickness has been deposited, the entire coated area is electroless Ni plated, using an electroless Ni deposit of low alloy composition. An example of this is the allow of 98–96% Ni/2–4% P deposited from Enthone EN 426. The result of this is shown in FIG. 2A. The coating and plating are then machined from the land area to re-expose the tool steel. This is shown in FIG. 2B. This process yields an exposed edge at the junction of the insulating coating and the steel land which is similar to that formed by simply restricting the coating and plating to the pool area in the first place. However, as the insulator has now been plated with an electroless Ni deposit, it can be replated with a second metal layer using a different preplating procedure which will provide adhesion to both the initial electroless Ni coating and to the steel land. This second metal layer may be deposited either electrolytically or electrolessly following a pretreatment which will provide adhesion to both metal surfaces. For example, for replating using a second electroless Ni layer, common preplating procedures include activation of the surface with an electrolytic Ni strike or activation with a chemical activating solution just prior to electroless Ni deposition. For an electrolytic plated second layer, preplating conditions common to the art are useful for depositing a layer of Ni, Ni alloys, Cr, and the like. The protected edge is shown schematically in FIG. 2C.

With this edge design, the coated insulator is restricted to the pool area where it is protected from damage during movement of the dynamic edges. It is also fully covered by a continuous metal exterior which extends beyond the insulator and bonds to the steel land and is therefore impervious to erosion by the resin melt.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. A multilayer mold for molding thermoplastic into finished parts, comprising:

a metal core having a mold area and adjacent elevated land area; an insulating layer of temperature-resistant polymer having low thermal conductivity deposited in the mold area; said temperature-resistant polymer being selected from filled or unfilled polyimides, polyamideimides, polyamides, polysulfones, polyether sulfones or polytetrafluoroethylenes, and at least one metal layer deposited on the insulating layer in the mold area, a juncture being formed by said one metal layer and said elevated land area, said metal layer being selected from nickel, carbon steel, stainless steel, aluminum, brass, copper, or ferronickel alloy, and another metal layer extending over said one metal layer, said juncture, and said land area to form a cohesive metal coating.

2. A mold according to claim 1 further comprising an intermediate primer layer between the insulating layer and the at least one metal layer.

3. A mold according to claim 1 wherein the intermediate layer comprises:

a metal-containing primer layer comprising a suspension of metal particles in a temperature-resistant polymer having low thermal conductivity, deposited on said insulating layer.

4. A mold according to claim 1 wherein the polymer is a polyimide or polyamideimide.

5. A mold according to claim 4 wherein the metal particles are nickel.

6. A mold according to claim 1 wherein the other metal layer extends over the land area and exterior sides of the mold core.

7. A mold according to claim 1 wherein the other metal layer extends up to the land and is coplanar therewith.

* * * * *